United States Patent
Gordon

(10) Patent No.: US 12,327,644 B2
(45) Date of Patent: *Jun. 10, 2025

(54) TRIGGERING EXOTHERMIC REACTIONS UNDER HIGH HYDROGEN LOADING RATES

(71) Applicant: IHJ Holdings Ltd., Jersey (JE)

(72) Inventor: Julie Anne Gordon, Coppell, TX (US)

(73) Assignee: IHJ Holdings Ltd., St. Helier (JE)

( * ) Notice: Subject to any disclaimer, the term of this patent is extended or adjusted under 35 U.S.C. 154(b) by 38 days.

This patent is subject to a terminal disclaimer.

(21) Appl. No.: 18/320,275

(22) Filed: May 19, 2023

(65) Prior Publication Data

US 2023/0290526 A1 Sep. 14, 2023

Related U.S. Application Data

(62) Division of application No. 16/497,503, filed as application No. PCT/US2018/024790 on Mar. 28, 2018, now abandoned.

(Continued)

(51) Int. Cl.
  *G21B 1/11* (2006.01)
  *B01J 19/08* (2006.01)
  (Continued)

(52) U.S. Cl.
  CPC ............. *G21B 1/11* (2013.01); *B01J 19/08* (2013.01); *B01J 19/087* (2013.01); *B01J 19/088* (2013.01);
  (Continued)

(58) Field of Classification Search
  CPC .. G21B 1/11; G21B 3/002; G21B 3/00; C25B 11/052; C25B 9/17; B01J 19/08; B01J 19/087; B01J 19/088; B01J 2219/0809; B01J 2219/0841; B01J 19/249; B01J 2208/00309; B01J 2219/2453; C01B 3/0026; Y02E 30/10; H01J 61/12; H01J 9/395; H01J 65/06; H01J 61/06; H01J 61/42; H01J 9/02; H01J 61/526; H01J 61/28; H01J 61/36; H05B 41/36; H01M 8/04313; H01M 8/04; H01M 8/04932; H01M 8/04858; H01M 8/0625; H01M 8/0612; H01M 8/04225; H01M 8/04776;
  (Continued)

(56) References Cited

U.S. PATENT DOCUMENTS

| 11,008,666 B2 * | 5/2021 | Letts .................. C25D 5/10 |
| 2005/0236376 A1 * | 10/2005 | Eccles .................. G21B 3/00 |
| | | 219/121.36 |

OTHER PUBLICATIONS

Rudy, Andrew, U.S. Appl. No. 18/059,588 Office Action dated Apr. 4, 2023.

* cited by examiner

*Primary Examiner* — Xiuyu Tai
(74) *Attorney, Agent, or Firm* — NK Patent Law

(57) ABSTRACT

Methods and apparatus are disclosed for triggering an exothermic reaction under a high hydrogen loading rate. It is generally understood that a high hydrogen loading ratio is an important factor. The present application teaches that a high hydrogen loading rate, that is, achieving a high hydrogen loading ratio in a short period of time, is another important factor in determining whether excess heat can be observed in an exothermic reaction. The present application discloses methods and apparatus for achieving a high hydrogen loading rate in order to trigger an exothermic reaction.

10 Claims, 4 Drawing Sheets

Related U.S. Application Data

(60) Provisional application No. 62/478,080, filed on Mar. 29, 2017.

(51) Int. Cl.
  *C01B 3/00* (2006.01)
  *C25B 9/17* (2021.01)
  *C25B 11/052* (2021.01)
  *G21B 3/00* (2006.01)

(52) U.S. Cl.
  CPC .............. *C01B 3/0026* (2013.01); *C25B 9/17* (2021.01); *C25B 11/052* (2021.01); *G21B 3/002* (2013.01); *B01J 2219/0809* (2013.01); *B01J 2219/0841* (2013.01)

(58) Field of Classification Search
  CPC ........... H01M 8/0618; H01M 8/04302; H01M 8/0606; H01M 8/10
  See application file for complete search history.

TRIGGERING EXOTHERMIC REACTIONS UNDER HIGH HYDROGEN LOADING RATES

CROSS-REFERENCE TO RELATED APPLICATIONS

This application is a divisional application of U.S. patent application Ser. No. 16/497,503, filed on Sep. 25, 2019, which is a U.S. National Stage Application of International Application No. PCT/US2018/024790, filed on Mar. 28, 2018, which claims priority to U.S. Provisional Patent Application No. 62/478,080 filed on Mar. 29, 2017, and the entire contents of all of which are hereby incorporated by reference herein.

TECHNICAL FIELD

The present invention relates generally to heat generation in an exothermic reaction, and more specifically, to controlling a hydrogen or deuterium loading rate to trigger an exothermic reaction.

BACKGROUND

Heat generation in an exothermic reaction involving hydrogen or deuterium atoms loaded in a metal lattice has been observed and confirmed by independent teams around the world. Examples of metal lattices include palladium, nickel, alloys etc. However, attempts to reproduce those exothermic reactions in a consistent manner have failed.

Many factors are deemed important in determining whether excess power will be observed in an exothermic reaction. For example, when a hydrogen or deuterium gas is loaded into a metal lattice, a loading ratio higher than 0.8 is considered a necessary but insufficient condition in triggering an exothermic reaction. A "rough" surface on the metal lattice is also considered important because a metal lattice with a rough surface can achieve a higher hydrogen loading ratio than a smooth surface.

The present application discloses novel and advantageous methods and apparatus for triggering an exothermic reaction consistently.

SUMMARY

The present disclosure relates to triggering conditions for an exothermic reaction. In the present disclosure, the term "hydrogen" is used to refer to a hydrogen gas comprising pure deuterium, trillium, or any combination of the three isotopes.

In some embodiments, a device configured for hosting an exothermic reaction comprises a hydrogen absorbing material and one or more input ports. The one or more input ports are configured for receiving a gas inlet and one or more controlling devices. The one or more controlling devices are configured to apply a condition to achieve a high hydrogen loading rate, under which an exothermic reaction is initiated.

In some embodiments, a method for triggering an exothermic reaction in a reaction chamber comprises the following steps. First, a hydrogen gas is introduced into the reaction chamber. The reaction chamber contains a hydrogen absorbing material. While the hydrogen gas is loaded into the hydrogen absorbing material, a condition is applied to achieve a high hydrogen loading rate, under which an exothermic reaction is initiated.

In some embodiments, a method of triggering an exothermic reaction in a reaction chamber is disclosed. A hydrogen gas is first introduced into the metal container before a first condition is applied. Under a first condition, the hydrogen gas is loaded into the hydrogen absorbing material to achieve a first hydrogen loading ratio within a first time period. Afterwards, a second condition is applied. Under the second condition, the hydrogen gas is loaded into the hydrogen absorbing material to achieve a second hydrogen loading ratio within a second time period. The second loading ratio is higher than the first loading ratio and the second time period is shorter than the first time period. An exothermic reaction may be initiated under the second condition. In some embodiments, applying the first condition is optional.

In some embodiments, a device configured for triggering and sustaining an exothermic reaction is disclosed. The device comprises a container, one or more electrodes, and one or more input ports. In one embodiment, the device is configured to host a type of exothermic reaction that involves a transition metal loaded with hydrogen. In one embodiment, the metal container is plated with a hydrogen absorbing material and receives the one or more electrodes through a port at the end of the metal container. The one or more input ports are configured to receive one or more controlling devices. The one or more controlling devices are configured to apply different conditions under which a hydrogen gas can be loaded into the hydrogen absorbing material. Under a first condition, the hydrogen gas is loaded into the hydrogen absorbing material at a first hydrogen loading ratio within a first time period. Under a second condition, the hydrogen gas is loaded into the hydrogen absorbing material at a second hydrogen loading ratio within a second time period. The second hydrogen loading ratio is higher than the first hydrogen loading ratio. An exothermic reaction is triggered under the second condition.

In yet another embodiment, a device configured for an exothermic reaction comprises an electrolytic cell. The device comprises a container filled with an electrolyte. The device further comprises one or more input ports for receiving a cathode and an anode. The cathode is plated with a hydrogen absorbing material and can absorb or adsorb a hydrogen gas. When the hydrogen gas is loaded into the hydrogen absorbing material at a high hydrogen loading rate that exceeds a threshold, an exothermic reaction may be triggered.

DETAILED DESCRIPTION

Figure 1:
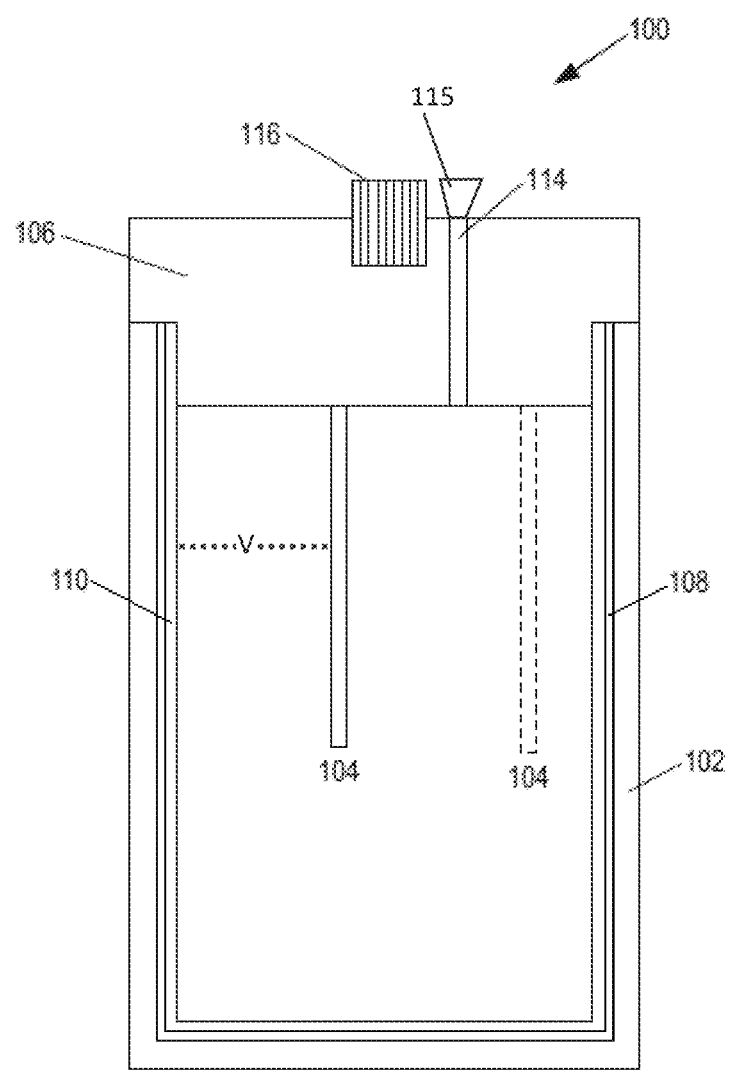
FIG. 1 illustrates an exemplary reactor configured for heat generation.

FIG. 1 illustrates an exemplary reactor 100 configured for exothermic reactions. The reactor 100 comprises a container 102, one or more electrodes 104, and a lid 106. In FIG. 1, the lid 106 is placed at one end of the reactor 100 and is used to accommodate the one or more electrodes 104, input/output ports 114, and a removable electrical pass-through

116. The one or more electrodes 104 may be made of tungsten, molybdenum, cobalt, or nickel, or other rugged metal that can withstand high voltage and high temperature environment. In some embodiments, the positive electrode is made of or plated with palladium. In some embodiments, the negative electrode is platinum. One of the input/output ports 114 can be used to introduce reaction gases into the reactor 100 or extract resultant gases from the reactor 100. The input/output ports 114 can also be used to accommodate pressure controlling devices 115, which can be used to apply a vacuum, extract gases or input gases.

In one type of exothermic reactions, two deuterium atoms or ions fuse to form helium and release energy in the process. The reactor 100 shown in FIG. 1 can be configured as follows. In one exemplary reactor 100, the container 102 is made of metal. The interior wall of the container 102 is first plated with gold 108 or another material (e.g., silver). The plated gold or silver functions as a seal to prevent reaction gasses in the chamber from escaping through the wall of the reaction chamber 100. On top of the gold 108, a layer of hydrogen absorbing material is plated. Outside the reactor 100, a magnet may be optionally placed.

In some embodiments, the exemplary reactor 100 is configured as an electrolytic cell. The container 102 may be filled with an electrolyte. The container 102 further comprises two electrodes, a cathode and an anode, which are accommodated through the input/output ports 114. Power lines may be accommodated through the electrical pass-through 116.

In certain types of exothermic reactions, the reactor 100 needs to be preconditioned for an exothermic reaction to happen. One of the prerequisite conditions is that the hydrogen absorbing material 110 is loaded with hydrogen/deuterium. In some embodiments, an exothermic reaction can be triggered when the hydrogen loading ratio exceeds a threshold. A hydrogen loading ratio describes how much hydrogen or deuterium has been absorbed or adsorbed into the hydrogen absorbing material, e.g., palladium. For example, in one exemplary embodiment in which the reaction chamber 100 is an electrolytic cell, the cathode of the electrolytic cell is plated with palladium. As a hydrogen/deuterium gas is loaded into the palladium, an exothermic reaction may be triggered when the loading ratio exceeds a certain threshold.

It is generally understood that the loading ratio of hydrogen is important in triggering an exothermic reaction. While a general correlation between high hydrogen loading ratios and excess heat generation has been observed, no triggering mechanism that can be used to consistently initiate an exothermic reaction has been identified. One postulation is that a high hydrogen loading ratio is a necessary but insufficient condition for triggering an exothermic reaction. On the other hand, a high loading rate may provide a consistent triggering mechanism for excess heat generation. In some embodiments, an exothermic reaction may be triggered under a fast hydrogen loading rate. A hydrogen loading rate describes how fast the hydrogen is being absorbed or adsorbed into the hydrogen absorbing material.

In some embodiments, a high hydrogen/deuterium loading rate triggers an exothermic reaction. For example, when a hydrogen gas is pressurized into the reaction chamber 100, a large flow of hydrogen/deuterium gas is introduced into the reaction chamber 100 in a short period of time. When hydrogen/deuterium ions/atoms are loaded into the lattice quickly, an exothermic reaction can be induced. The exothermic reaction may be between the hydrogen/deuterium atoms/ions that are "jammed" into the metal lattice, which plays a catalytic role in the exothermic reaction.

In some embodiments, a high hydrogen/deuterium loading rate can be achieved by applying a magnetic field or imposing a voltage. Hydrogen ions are accelerated to a high speed when under the influence of a strong magnetic field or a high voltage (electric field). When high speed hydrogen/deuterium ions enter a metal lattice, an exothermic reaction may be induced, due to the high kinetic energy of the hydrogen/deuterium ions loaded into the metal lattice.

In some embodiments, when a hydrogen/deuterium gas is loaded quickly into a metal lattice, e.g., palladium, the distribution of hydrogen atoms/ions inside the metal lattice may be uneven. Within certain areas, the hydrogen/deuterium loading ratio may be higher than the average loading ratio. Within certain pockets, the hydrogen/deuterium loading ratio can exceed the threshold required for triggering an exothermic reaction.

Figure 2:
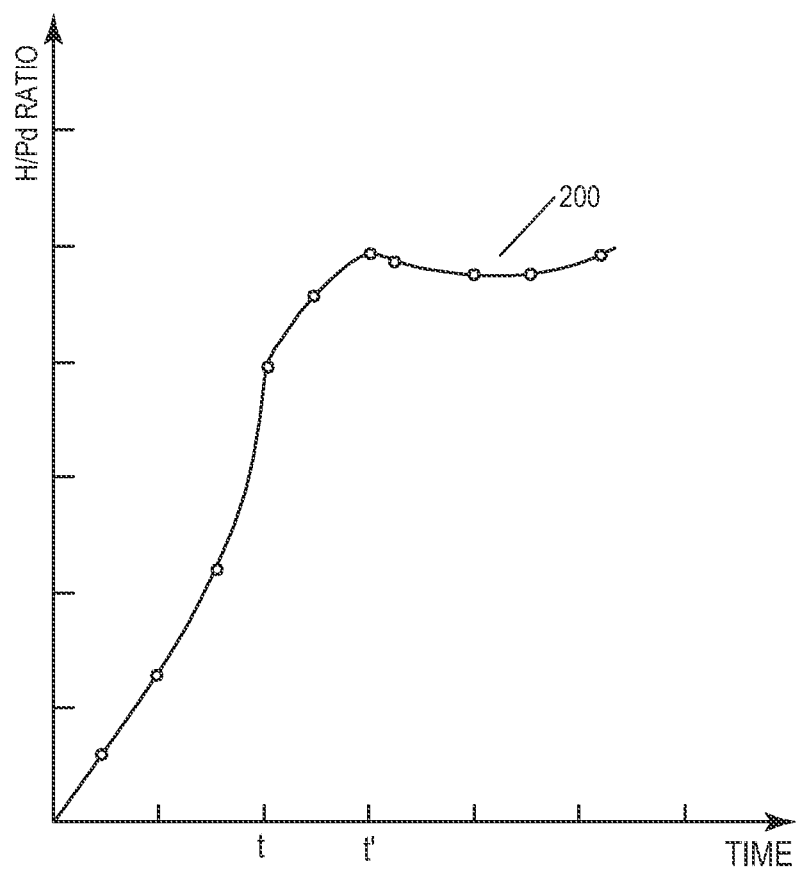
FIG. 2 illustrates an exemplary curve showing a hydrogen loading process in a metal lattice.

FIG. 2 illustrates an exemplary hydrogen absorbing process 200 in a hydrogen absorbing material such as palladium. In FIG. 2, the x-axis shows the elapsed time and the y-axis shows the hydrogen loading ratio measured as the ratio between the hydrogen atoms/ions loaded into the metal lattice and the palladium atoms of the hydrogen absorbing material. Initially, when a hydrogen absorbing material is placed in a hydrogen/deuterium gas, the hydrogen or deuterium gas is being adsorbed and absorbed quickly. After a period of time, t, the hydrogen loading process slows down, until the hydrogen absorbing material is "saturated" with hydrogen/deuterium. The hydrogen loading ratio remains substantially stable after t'.

Figure 3:
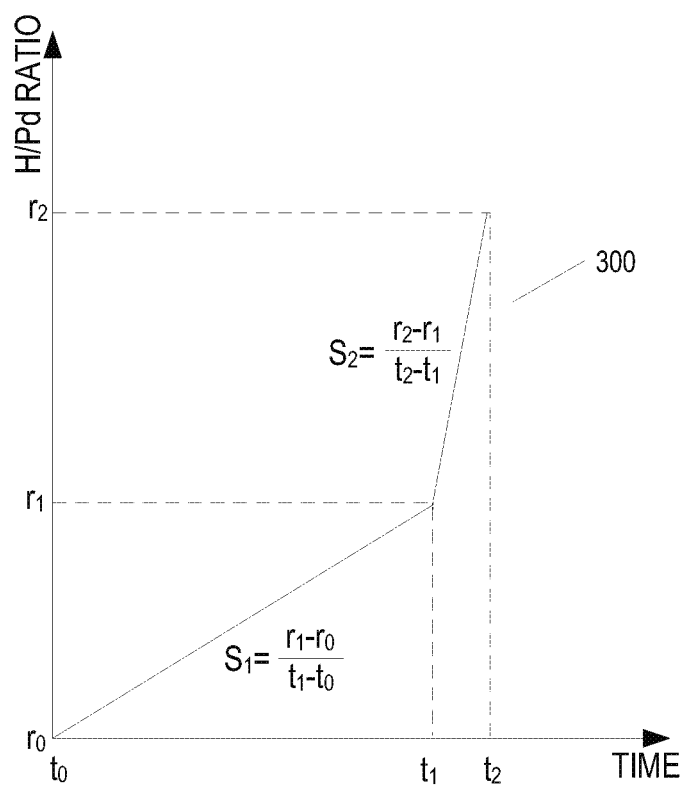
FIG. 3 illustrates an exemplary curve showing another hydrogen loading process in a metal lattice.

FIG. 3 illustrates an exemplary hydrogen loading process 300. During the first stage of the hydrogen loading process 300, between $t_0$ and $t_1$, an optional first loading condition is applied in the reaction chamber 100. The first loading condition may include a pressure $P_1$ and a temperature $T_1$. Additionally, the first loading condition may include a voltage $V_1$, a magnetic field $B_1$, etc. As the hydrogen is loaded into the hydrogen absorbing material, e.g., a palladium lattice, the hydrogen loading ratio steadily increases from $r_0$ to $r_1$ during the time period between $t_0$ and $t_1$. The loading rate during this time period is:

$$S_1 = \frac{r_1 - r_0}{t_1 - t_0} \quad (1)$$

During the time period between $t_1$ and $t_2$, a second condition is applied inside the reaction chamber 100. The second condition may include one or more of the following: a pressure $P_2$, a temperature $T_2$, a voltage $V_2$, a magnetic field $B_2$, etc. Under the second condition, the hydrogen is being loaded into the hydrogen absorbing material faster than under the first condition. The loading ratio increases from $r_1$ to $r_2$ during the second time period between $t_1$ and $t_2$. The loading rate under the second condition during the second time period is:

$$S_2 = \frac{r_2 - r_1}{t_2 - t_1} \quad (2)$$

When under the second condition, because of the rapid loading of hydrogen, an exothermic reaction is triggered. In one embodiment, the device 100 comprises a metal container 102 that is plated with palladium or nickel. An electrode 104 made of a metal, such as Molybdenum, is present in the middle of the container. Hydrogen or deuterium is present in the closed container under normal pressure conditions (e.g., <2 PSI). A negative voltage or ground is applied to the hydrogen absorbing lattice while a positive voltage is applied to the electrode 104. In one embodiment, the voltage is about 5000V. In another embodiment, the voltage ranges between 3000V to 6000V. This voltage change creates a strong electric field that causes the hydrogen or deuterium to "slam" into the palladium/nickel wall, yielding a loading rate higher than normal. Under this fast loading rate, loaded hydrogen atoms/ions are distributed in the metal lattice unevenly and small areas with high hydrogen loading ratio may be formed.

In another embodiment, the metal container 102 in the reaction chamber 100 holds palladium or nickel nanoparticles. The container 102 is initially set at a vacuum, e.g., 10^7 Torr or higher. Deuterium or hydrogen is introduced into the container quickly, causing pressure to increase from a vacuum to at least 100 PSI within a short period of time. In one embodiment, the pressure increases from a high vacuum to 100 PSI in 15 seconds. This sudden increase of pressure creates areas of high concentration hydrogen/deuterium. Within those areas, hydrogen/deuterium loading ratios are high, and an abnormal heat generation event can be triggered to promote excess heat generation.

Figure 4:
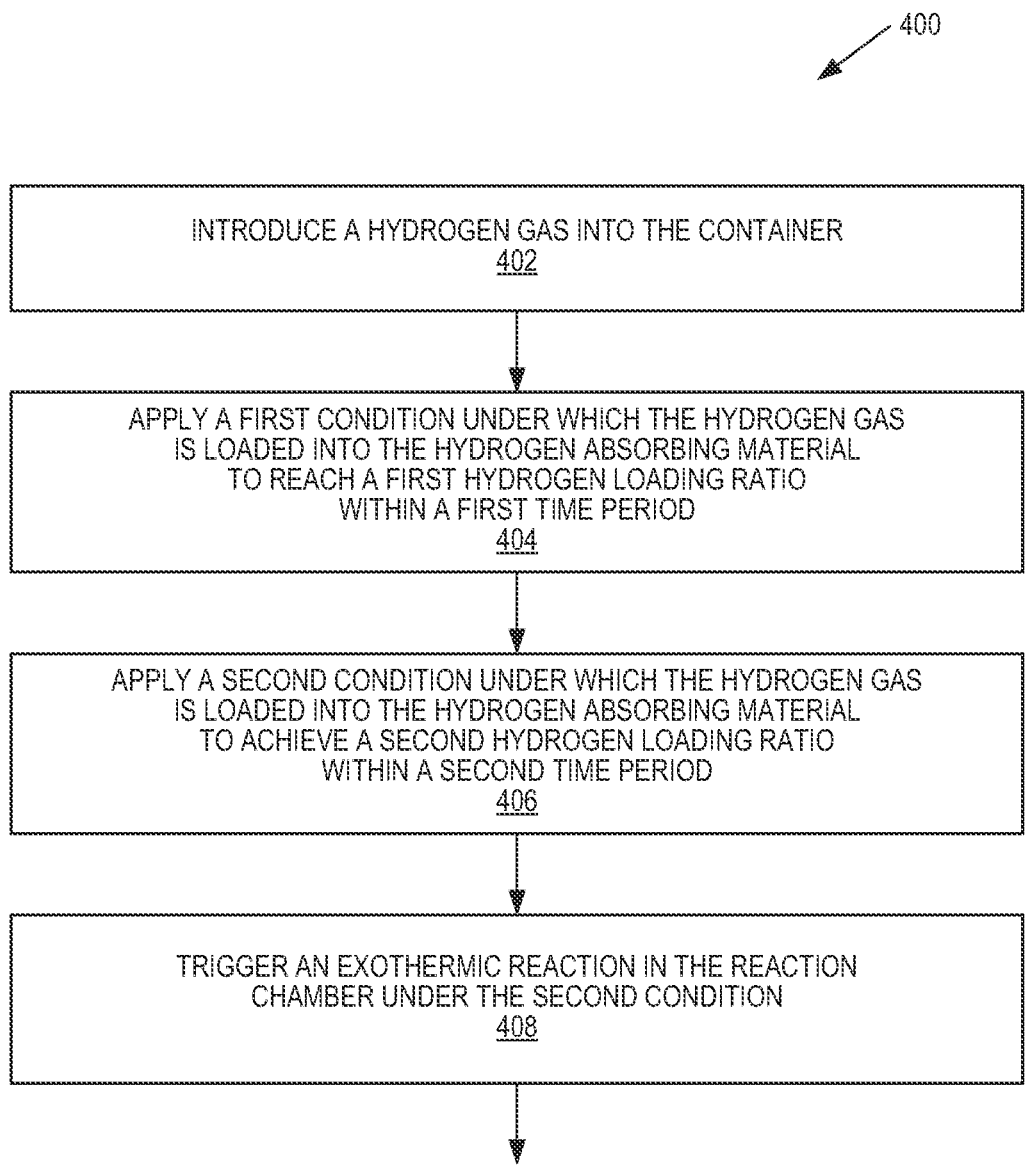
FIG. 4 is a flow chart illustrating an exemplary triggering method of an exothermic reaction under a high hydrogen loading rate.

FIG. 4 illustrates an exemplary triggering process 400 of an exothermic reaction under a high hydrogen loading rate. In the process 400, a hydrogen gas is first introduced into the metal container (step 402). During a first time period, a first condition is applied. Under the first condition, the hydrogen gas is loaded into the hydrogen absorbing material to reach a first hydrogen loading ratio within a first time period (step 404). During a second time period, a second condition is applied. Under the second condition, the hydrogen gas is loaded into the hydrogen absorbing material to achieve a second hydrogen loading ratio (step 406). The second hydrogen loading ratio is higher than the first hydrogen loading ratio. Under the second condition, an exothermic reaction is triggered in the reaction chamber 100 (step 408).

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A device configured for triggering and sustaining an exothermic reaction utilizing an isotope and hydrogen gas mixture, comprising:
  a reaction chamber comprising:
    a metallic housing having an interior surface and configured to be grounded or accept a negative voltage,
    a first plated layer disposed along the interior surface, wherein the first plated layer comprises at least one of silver and gold,
    a second plated layer disposed along a first surface of the first plated layer,
    wherein the first surface of the first plated layer is opposite a second surface of the first plated layer in contact with the interior surface of the metallic housing, and
    wherein the second plated layer comprises a hydrogen absorbing material,
    a lid configured to accommodate an electrode, at least one gas port, and an electrical pass-through,
    wherein the at least one gas port is configured to accommodate a control device,
    wherein the electrical pass-through is configured to accommodate electrical communication with the electrode, and
    an interior space defined by the lid and the second plated layer,
    wherein the control device is configured to at least one of create a vacuum in the interior space, remove the gas mixture from the interior space, and insert the gas mixture into the interior space; and
    wherein the reaction chamber is configured to accommodate application, through at least one of the control device and the electrode, of a first condition and a second condition,
    wherein each of the first condition and second condition are associated with a respective gas mixture loading rate comprising a particular loading ratio for the gas mixture into the hydrogen absorbing material over a specific time period, and
    wherein the second condition is associated with a higher gas mixture loading rate than that of the first condition and the second condition is configured to initiate the exothermic reaction.

2. The device of claim 1, wherein the first condition comprises the control device inserting the gas mixture into the interior space until a set pressure within the interior space is reached, wherein the set pressure is below 2 PSI and wherein the second condition comprises a voltage differential between the hydrogen absorbing material and the electrode through application of voltage to the electrode.

3. The device of claim 2, wherein the voltage differential is within a range of 3000V to 6000V.

4. The device of claim 1, wherein the first condition comprises the control device creating the vacuum within the interior space is reached and wherein the second condition comprises the control device inserting the gas mixture into the interior space for 15 seconds to reach a set pressure of 100 PSI within the interior space.

5. The device of claim 1, wherein the electrode comprises one or more of tungsten, molybdenum, cobalt, and nickel.

6. The device of claim 1, wherein the electrode comprises a rugged metal configured to withstand voltage and temperature conditions associated with the exothermic reaction.

7. The device of claim 1, wherein the hydrogen absorbing material comprises one or more of palladium and nickel.

8. The device of claim 1, wherein the gas mixture comprises one or more of deuterium and trillium isotopes.

9. The device of claim 1, further comprising a magnet disposed outside the chamber configured to impose a magnetic field on the interior space.

10. The device of claim 1, wherein the electrical pass-through is removable.

* * * * *